W. HUNT.

Cartridge.

No. 163.

Reissued Feb. 26, 1850.

N. PETERS, PHOTO-LITHOGRAPHER, WASHINGTON, D. C.

UNITED STATES PATENT OFFICE.

WALTER HUNT, OF NEW YORK, N. Y., ASSIGNOR TO WM. R. PALMER.

METHOD OF ATTACHING A BALL TO A CARTRIDGE.

Specification forming part of Letters Patent No. 5,699, dated August 10, 1848; Reissue No. 163, dated February 26, 1850.

*To all whom it may concern:*

Be it known that I, WALTER HUNT, of the city, county, and State of New York, have invented a new and useful Improvement in Attaching Balls to Cartridges; and that the following is a full, clear, and exact description of the principle or character which distinguishes it from all other things before known, and of the method of making, constructing, and using the same, reference being had to the accompanying drawings, making part of this specification, in which—

Figure 1:
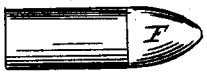
Figure 2:
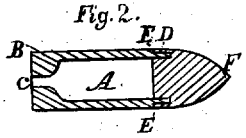
Figure 3:
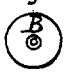
Figure 4:
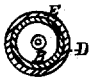
Figure 5:
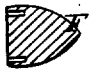
Figure 6:
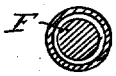

Figure 1 is an elevation of the united ball and cartridge; Fig. 2, a longitudinal section of the same; Figs. 3 and 4, back and front end views of the cartridge; Fig. 5, a longitudinal section of the ball, and Fig. 6 a back end view of the same.

The same letters indicate like parts in all the figures.

The nature of my invention consists in making the cartridge of a cylindrical form, of wood or other equivalent substance, bored out or otherwise formed with the rear end closed, except a central hole for the ignition of the charge by the priming when this is combined with and attached to the rear end of a ball by inserting one into the other.

In the manufacture of said cartridges I use wood of a soft texture. The American basswood I find preferable. I make them externally (see Fig. 1 in the annexed drawings) in the form of a cylindrical ferrule or cup, having a similarly-formed internal cavity, A, with a thick bottom, B, formed all of the same piece. Through the center of said bottom is a small perforation, C, through which the charge is ignited by the priming. (See horizontal cut section, Fig. 2, rear end view, Fig. 3, and front end view, Fig. 4.) The front or open end of said cartridge is formed into a circular tenon, D, leaving a shoulder at E, which tenon is made to fit into a corresponding mortise or circular recess cut or otherwise formed into the rear end of the ball F. (See Fig. 5, which shows a longitudinal cut section of the same as separated from the cartridge, and Fig. 6 a rear-end view.)

In the process of filling these cartridges, a small wad or pledget of gun-cotton being first introduced into the perforation C, the cartridge, in a vertical position, is then filled with powder, when the rear end of the ball is forced down upon the powder into the end of the cartridge, while the tenon D enters the cavity or mortise F in the end of the ball, by which means the powder is properly compressed, and the ball and cartridge become firmly united together, which may be done with facility in a mold or tube fitted to the size of the cartridge by hand, machinery, or otherwise.

It will be observed that this plan of a cartridge is exclusively designed for loading at the breech, for the reason that the wooden cartridge is always left in the breech of the barrel and fired out in front of each succeeding ball.

The advantages of the wooden cartridge over any other material used for loading at the breech are:

First, when the piece is discharged the expansive force and heat of the powder fracture or split the thin portion of the cylinder down to near the bottom into four equal and uniform staves, which are separated at the muzzle of the piece by the atmospheric resistance, leaving the ball to pass undisturbed in its course between them.

Second, while in the barrel the wooden cartridge retains its form without adhering to the barrel, however foul the piece may be, and in passing out operates like a wiper, in consequence of its soft texture, without injuring the cut of the smoothest rifle.

Third, it retains a uniform shape, and when introduced is not liable to become distorted and hang in the tube, especially if previously saturated with tallow, in which case it is rendered water-proof.

What I claim as my invention, and desire to secure by Letters Patent, is—

The method substantially as herein described of attaching or joining to a ball a cartridge made of wood or other equivalent material, in manner substantially as herein described.

WALTER HUNT.

Witnesses:

ROBT. D. HOLMES,
WILLIAM H. MARSAC.